(12) United States Patent
Neubert

(10) Patent No.: US 8,468,666 B2
(45) Date of Patent: Jun. 25, 2013

(54) APPARATUS FOR EXTRACTING A MANDREL FROM A SHELL WOUND THEREON

(75) Inventor: Mike Neubert, Dautphetal (DE)

(73) Assignee: EHA Spezialmaschinenbau GmbH, Steffenberg (DE)

( * ) Notice: Subject to any disclaimer, the term of this patent is extended or adjusted under 35 U.S.C. 154(b) by 318 days.

(21) Appl. No.: 12/912,873

(22) Filed: Oct. 27, 2010

(65) Prior Publication Data

US 2011/0094095 A1  Apr. 28, 2011

(30) Foreign Application Priority Data

Oct. 27, 2009 (EP) ..................................... 09013520

(51) Int. Cl.
*B23P 19/04* (2006.01)

(52) U.S. Cl.
USPC .................. 29/234; 29/252; 29/255; 29/426.5

(58) Field of Classification Search
USPC ......... 29/426.5, 234, 282, 255, 252; 242/533, 242/533.1, 533.2, 533.3, 533.7; 269/26, 268
See application file for complete search history.

(56) References Cited

U.S. PATENT DOCUMENTS

| | | | | |
|---|---|---|---|---|
| 1,447,766 A | * | 3/1923 | De Vignier | 29/252 |
| 2,667,356 A | * | 1/1954 | Foward | 279/4.1 |
| 2,974,217 A | * | 3/1961 | Crawford | 219/101 |
| 3,061,914 A | | 11/1962 | Johnston | |
| 4,028,926 A | * | 6/1977 | Olesovsky | 72/422 |
| 4,711,011 A | * | 12/1987 | Nugier | 29/239 |
| 5,031,297 A | * | 7/1991 | Nelson | 29/446 |
| 5,167,058 A | * | 12/1992 | Armstrong, Jr. | 29/252 |
| 5,424,015 A | | 6/1995 | Matsuda et al. | |
| 6,363,594 B1 | * | 4/2002 | Jahani et al. | 29/235 |
| 6,530,719 B1 | * | 3/2003 | Stephan | 403/364 |
| 2008/0223615 A1 | * | 9/2008 | Anderson | 175/19 |

FOREIGN PATENT DOCUMENTS

| | | |
|---|---|---|
| DE | 4032273 A1 | 4/1992 |
| SU | 481339 A * | 11/1975 |

* cited by examiner

*Primary Examiner* — David Bryant
*Assistant Examiner* — Justin Sikorski
(74) *Attorney, Agent, or Firm* — Andrew Wilford

(57) ABSTRACT

An apparatus for separating from a mandrel a shell snugly surrounding the mandrel has a base, a frame fixed on the base, and a holder on the base forward of the frame and adapted to support the shell surrounding the mandrel with an end of the mandrel juxtaposed with the frame. At least two stripper jaws on the frame can move radially of the mandrel of the shell on the frame between outer positions spaced radially outward from the shell and inner positions engageable with the shell. An extractor slide can shift longitudinally on the base rearward of the frame and carries a gripper extendable through the frame to grasp the end of the mandrel. The slide can shift the gripper axially away from the frame to brace the shell axially through the jaws against the frame and pull the mandrel out of the shell.

15 Claims, 8 Drawing Sheets

APPARATUS FOR EXTRACTING A MANDREL FROM A SHELL WOUND THEREON

FIELD OF THE INVENTION

The present invention relates to an apparatus for separating a mandrel from a shell wound thereon. More particularly this invention concerns such an apparatus for pulling the mandrel out of the shell.

BACKGROUND OF THE INVENTION

In making, for example, a tank it is known for example from copending application Ser. Nos. 11/065,135 to wind a strand, normally a filament or tape impregnated with a curable synthetic resin, onto a mandrel. The shell thus formed takes on shape whose inner surface is a body of revolution that corresponds exactly to the cylindrical or frustoconical outer surface of the mandrel. The resin is then allowed to cure into a hardened state and then the mandrel and shell are separated by relative displacement parallel to the axis of the mandrel.

Various embodiments of mandrel-extraction apparatuses are well known in practice, but all have disadvantages. With these known apparatuses, special tool parts are required for mandrels of various size or for mandrels of different diameters. This factor entails significant tool costs and retooling costs, as well as disadvantageously long retooling times. Relative high forces are required to extract the mandrel from the shell. In addition, negative forces or disturbances are often produced in the known extraction apparatuses when the mandrel is extracted which result in degradation of the quality of the shell, even including destruction of the shell. The known extraction apparatuses are thus in need of improvement.

OBJECTS OF THE INVENTION

It is therefore an object of the present invention to provide an improved apparatus for extracting a mandril from a shell wound thereon.

Another object is the provision of such an improved apparatus for extracting a mandril from a shell wound thereon that overcomes the above-given disadvantages, in particular that is characterized by flexibility and variability in terms of mandrels of various size, and that furthermore insures a rapid, unconstrained, less costly and functionally reliable extraction of the mandrel, and specifically without degradation of the quality of the shell.

SUMMARY OF THE INVENTION

An apparatus for separating a mandrel extending along an axis from a wound shell snugly surrounding the mandrel and lying against an outer surface thereof has according to the invention a base, an upright frame fixed on the base, and a holder on the base forward of the frame and adapted to receive and support the shell surrounding the mandrel with an end of the mandrel in the shell on the support juxtaposed with the frame. At least two stripper jaws on the frame can move radially relative to the axis of the mandrel of the shell on the frame between outer positions spaced radially outward from the shell and inner positions radially engaging or axially engageable with the shell. An extractor slide can shift longitudinally on the base rearward of the frame and carries a gripper extendable past the frame to grasp an end of the mandrel of the shell on the holder. The slide can shift the gripper axially away from the frame while the gripper is grasping the mandrel end and while the stripper jaws are in their inner positions to brace the shell axially through the jaws against the frame and pull the mandrel out of the shell.

It is within the scope of the invention for the shell to be wound in a form-fit on the outer surface of the mandrel. The shell preferably is made of wound filaments or fiber strands, and in particular of filaments or fiber strands impregnated with resin or synthetic resin. The shell is advantageously inserted into the extraction apparatus according to the invention when the workpiece is cured. In terms of its cross-section, the mandrel is preferably round or circular. It is recommended that the mandrel be of cylindrical shape, and/or at least a portion thereof be of frustoconical shape. In principle, however, the cross-section of the mandrel can also be polygonal, in particular, rectangular. The mandrel is normally composed of metal, in particular, of steel.

It is within the scope of the invention for the shell to first be wound in a winding apparatus onto the mandrel. The shell can then be cured, as required. The workpiece consisting of the mandrel with the shell wound thereon is subsequently conveyed into the extraction apparatus according to the invention, or into the holder of the extraction apparatus. The mandrel is then advantageously extracted. The extracted mandrel is preferably conveyed back into the winding apparatus to wind up another shell on it.

In a highly preferred embodiment of the invention, the holder has at least two cradles for supporting the workpiece consisting of the mandrel and the shell. It is recommended that the support cradles be adjustable by servomotors longitudinally of the held mandrel, and/or vertically to adjust the level of the support faces of the support cradles. It is within the scope of the invention for the longitudinal axis of the mandrel to be oriented horizontally or essentially horizontally when the workpiece is supported on the cradles. In terms of cross-section, the support cradles are advantageously V-shaped, and the workpiece consisting of the mandrel and the shell is received between V-flanks of the support cradles. The V-flanks of the support cradles may, for example, be in the form of rollers or be fixed V-blocks. The level adjustment for the support cradles or of their support faces is effected to adjust to various diameters of the workpiece or of the mandrel. An adjustment of the support cradles longitudinally of the received mandrel is particularly advantageous whenever the mandrel is longer than the shell wound on the mandrel. When the mandrel is extracted, at least one support cradle on which only one portion of the mandrel projecting from the shell has rested until that time is then preferably made to follow in the extraction direction of the mandrel, with the result that the shell released from the mandrel then rests on this support cradle.

In an especially preferred embodiment of the invention, the gripper is mounted by a ball-type universal joint in the extractor slide. The gripper is preferably an extraction claw, and this extraction claw is mounted by a ball-type universal joint in the extractor slide. The universal-ball-joint mounting has proven to be especially effective in terms of a very uniform application of force on the mandrel. Within the scope of the invention, the term extraction claw refers to an element forming a seat that receives a coupling element of the mandrel. It is within the scope of the invention for the extractor slide with gripper or extraction claw to be movable horizontally, or essentially horizontally, longitudinally of the mandrel.

It is recommended that a mandrel pin projecting from the end of the mandrel be fixed to the gripper or to the extraction claw. This mandrel pin is preferably of a smaller or significantly smaller diameter than the mandrel. However, in principle the mandrel pin can also be of identical diameter to the mandrel or of larger diameter than the mandrel. It is within the scope of the invention for the mandrel pin to be provided at the longitudinal axis of the mandrel.

In a preferred embodiment of the invention, the stripper jaws are mounted on or attached to a stripper frame that has a stripper opening, and the mandrel is pulled by the extractor slide from the shell through this stripper opening. The extraction claw of the extractor slide is preferably able to reach through the stripper opening to grasp the mandrel. The stripper jaws are advantageously able to be moved radially inward toward the center of the stripper opening into engagement with the mandrel or onto the shell. It is recommended that the stripper opening be mounted centrally, or essentially centrally, within the stripper frame. The stripper frame is preferably of a design that is closed on all sides, or essentially closed on all sides. It is recommended that the stripper frame be in particular is closed at the top or at its top side. A very stable and torsion-resistant apparatus is created this way.

It is within the scope of the invention for the stripper jaws to be moved radially inward toward the mandrel, and in this way engaged with the mandrel or with the shell. In one embodiment of the invention, the stripper jaws are engaged with a portion of the mandrel that is not covered by the shell. When in the inner position, the stripper jaws here can be in direct contact with the surface of the mandrel or be mounted a slight spacing outward of the mandrel outer surface. It is within the scope of the invention that the stripper jaws in this embodiment are in this inner position such that, when the mandrel is extracted, the end face of the shell can bear on the stripper jaws such that the mandrel can be moved relative to the stripper jaws. In another embodiment, the stripper jaws in the region of the end of the mandrel affixed to the gripper can be engaged with the shell on the mandrel. Advantageously, only a thin wound layer is present on the mandrel in this region of the repositioned stripper jaws. The stripper jaws are engaged with the shell on the condition that the mandrel is extractable by the extractor slide from the shell, and therefore an extraction motion by the mandrel is can take place relative to the shell.

One embodiment of the invention is characterized in that the stripper jaws rest on a radial bulge in the shell when the mandrel is extracted. This radial bulge can be generated in an intentionally precise manner during the winding process. This then involves a kind of support ring that advantageously extends around the shell.

It is within the scope of the invention for at least two stripper jaws to be provided that can engage the mandrel or the shell located on the mandrel. The stripper jaws are preferably extendable by telescoping or are able to be engaged with the mandrel or the shell. If only two stripper jaws are present, they are advantageously on diametrically opposite sides of the mandrel. An especially preferred embodiment of the invention is characterized in that at least three, preferably at least four, and very preferably four stripper jaws are provided. It is within the scope of the invention for the stripper jaws to be distributed angularly around the outer surface of the mandrel or around the inner periphery of the stripper opening of the stripper frame. It is recommended that the stripper jaws be angularly equispaced relative to one another. When engaged radially with the mandrel or with the shell, the stripper jaws are advantageously moved at the same speed. One embodiment that has proven especially effective comprises four stripper jaws that preferably are angularly equispaced relative to one another.

In a preferred embodiment of the invention, the stripper jaws each have a concave support face for engaging the mandrel or the shell. The contact face of the stripper jaws is advantageously concave radially inward toward the mandrel. The stripper jaws thus form a trough for the mandrel or for the shell wound on the mandrel. This embodiment thus achieves a form-fit, or essentially form-fit, contact with the cross-sectionally round or circular, and especially cylindrical mandrels or shells. As has been already described above, engagement within the scope of the invention on the one hand means direct engagement by the stripper jaws with the mandrel or with the shell. On the other hand, however, the stripper jaws can also be mounted at a spacing or at a slight spacing from the mandrel or from the shell, provided that the shell can be braced against the stripper jaws when the mandrel is extracted, thereby enabling the mandrel to be moved or extracted relative to the shell.

It is of course understood that the degree of extension by the stripper jaws is dependent on the diameter of the mandrel or of the shell. In the event the diameter of the mandrel or of the shell is small, and especially very small, the stripper jaws might interfere with each other when engaged with or approaching the mandrel, in particular whenever at least three, or at least four, and preferably four, stripper jaws are repositioned radially. In light of this, it is within the scope of the invention for at least one part of the stripper jaws to be a jaw segment that can extend from the respective stripper jaw, and engage the mandrel or the shell. It is furthermore within the scope of the invention for the contact face of the jaw segment to be smaller radius of curvature than the contact face of the respective stripper jaw. One jaw segment is advantageously extendable relative to the respective stripper jaw without the stripper jaw actually moving radially. The jaw segments are preferably extendible by telescoping. In an especially preferred embodiment of the invention, each of the stripper jaws has one jaw segment. Whenever the mandrel or shell is of small diameter, at least one of the jaw segments can be engaged with the mandrel or onto the shell, instead of the entirety of the bulkier stripper jaws.

It is recommended that the contact face of the jaw segment be at least 50%, preferably 60%, smaller than the overall contact face of the respective stripper jaw. The term overall contact face of the stripper jaw here means the contact face when the jaw segment is retracted and thus also includes the contact face of the jaw segment. It is recommended that the contact faces of the jaw segments be concave. It is within the scope of the invention for the contact face of the jaw segments to be is concave in terms of the circumferential direction of the mandrel. When the jaw segment is in the retracted position, the concave contact face of the jaw segment is preferably flush with the concave contact face of the respective stripper jaw. One jaw segment is advantageously mounted centrally within each stripper jaw, in particular angularly of the mandrel.

In a highly preferred embodiment of the invention, in particular when the diameter of the mandrel or shell is small, only two jaw segments from opposite stripper jaws are moved or engaged with the mandrel or with the shell. Within the scope of this variant of an embodiment, it is also possible to extract the mandrel in a functionally reliable manner from the shell even when the diameters of the mandrel or shell are very small.

The invention is based on the idea that simple, rapid, and functionally reliable extraction of a mandrel from a shell is possible using the extraction apparatus according to the invention. For mandrels of various sizes or mandrels of various diameters, the same tool can be used within the scope of the invention, or the same tool components can be used within the scope of the invention. In this respect, the extraction apparatus according to the invention is distinguished by great flexibility and variability when compared to extraction apparatuses known from practice. Disadvantageously high retooling costs and disadvantageously long retooling times can be avoided. In addition, negative forces that result in degradation of the quality of the shell can be completely avoided when using the extraction apparatus according to the invention. Qualitatively flawless shells remain intact after the mandrel has been extracted. Nevertheless, the extraction apparatus according to the invention is of relatively simple construction, and can be implemented in a comparatively inexpensive manner.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
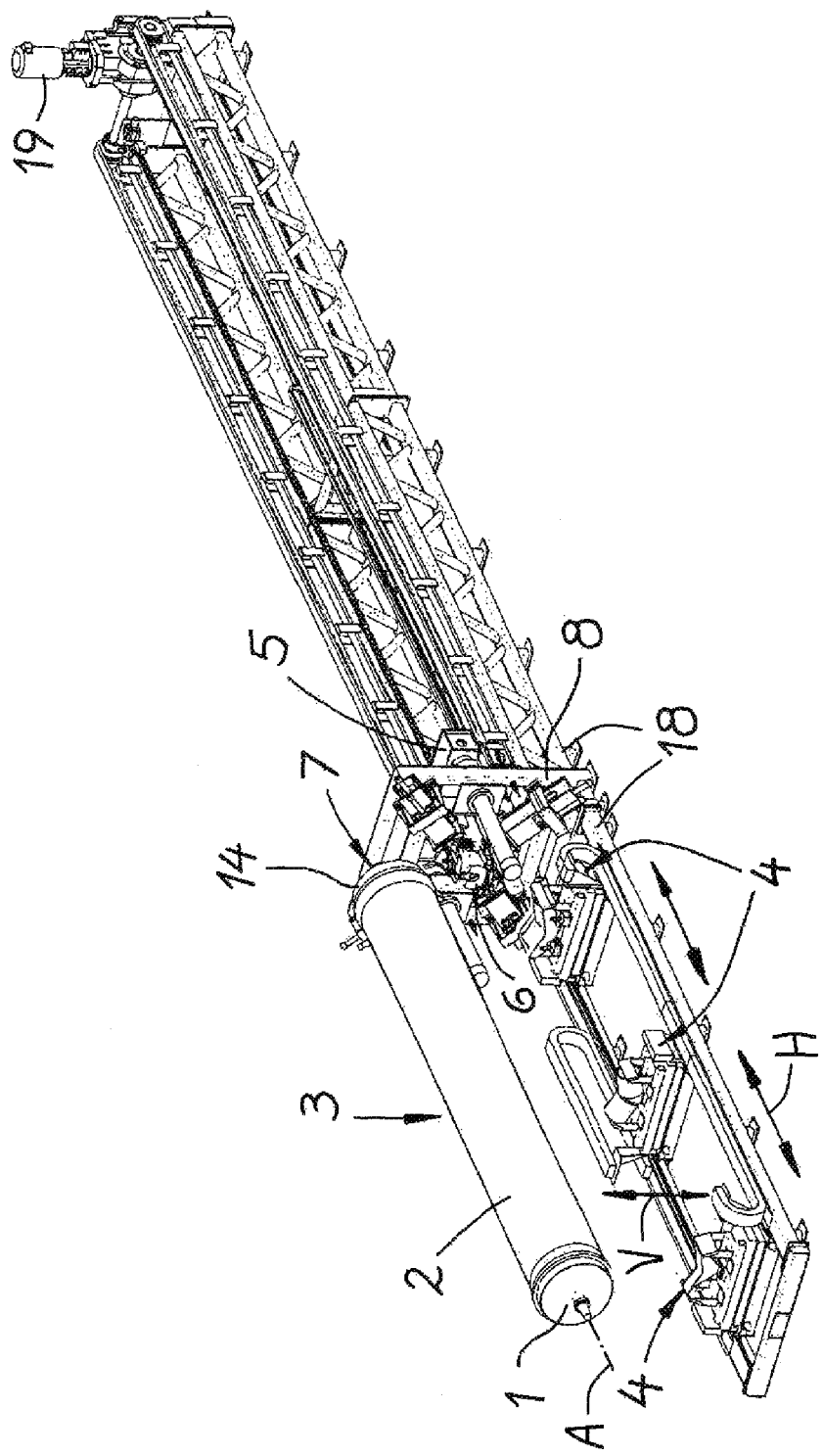
FIG. 1 is an overall perspective view of the extraction apparatus according to the invention in a first position.

As seen in the drawing, an extraction apparatus according to the invention serves for extracting a mandrel 1 from a tubular shell 2 wound on the mandrel 1. Both the mandrel 1 and the shell 2 are of cylindrical shape. The shell 2 may be composed of wound-up impregnated fiber strands. The shell 2 is first wound on the mandrel 1 in an unillustrated winding apparatus to form a workpiece 3 comprised of the shell 2 on the mandrel 1. The workpiece 3 is then conveyed to the extraction apparatus according to the invention (see specifically FIG. 1).

The extraction apparatus has a base 18 supporting a holder that receives the workpiece 3, which holder, both preferably and in the embodiment, has three support cradles 4. As has been recommended and in the illustrated embodiment, these is support cradles 4 are adjustable by servomotors longitudinally and horizontally of the mandrel 1 and vertically to adjust the level of the support face defined by the support cradles 4. This is shown in FIG. 1 by arrows V and H.

Figure 2:
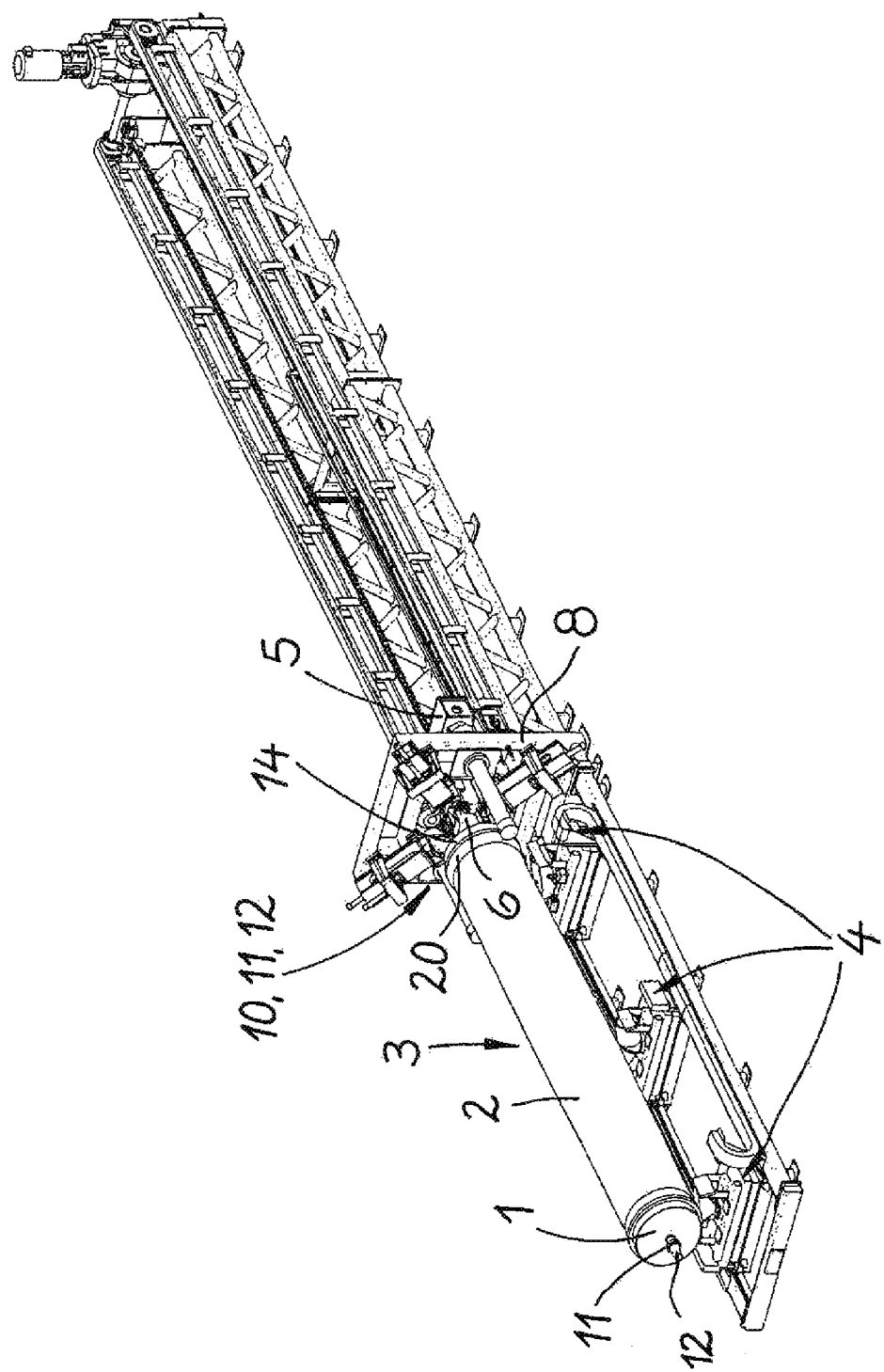
FIG. 2 shows the apparatus of FIG. 1 in a second position.
Figure 5:
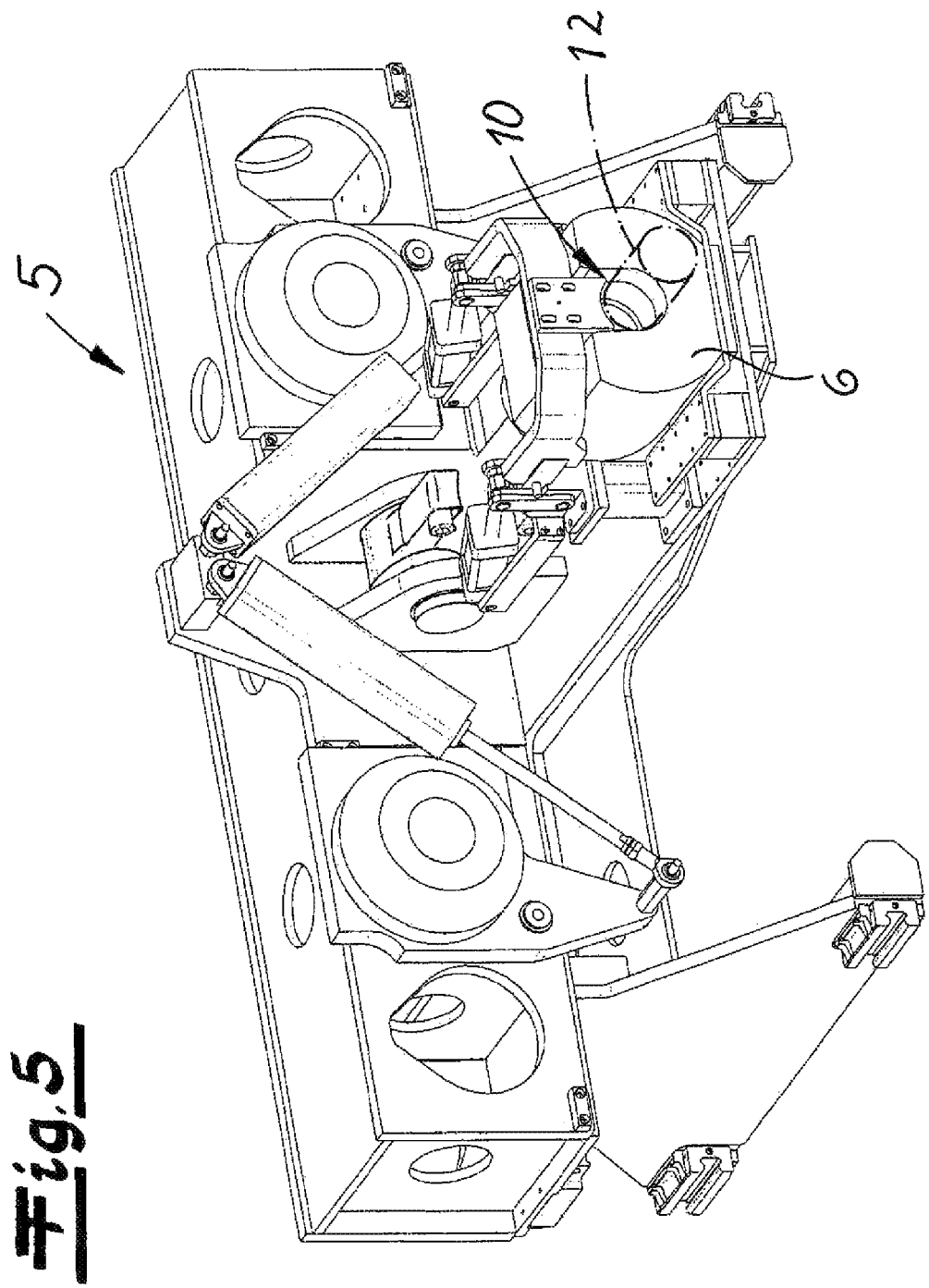
FIG. 5 is a perspective view of an extractor slide.

The extraction apparatus is furthermore equipped with an extractor slide 5 that can be shifted longitudinally along the base 18 by a drive motor 19 and that has an extraction or gripper claw 6 that can grasp an end 7 of the mandrel 1. FIGS. 1 and 2 show that the extractor slide 5 is mounted behind a stripper frame 8 fixed to the base 18 and that the extraction claw 6 can project longitudinally through a central opening 9 of the frame 8 into the region in front of stripper frame 8. The extraction claw 6 has a seat 10 in which a coupling element 11 of the mandrel 1 can fit so that the mandrel 1 can be pulled by the extraction claw 6 longitudinally of the mandrel 1. Other aspects of the extractor slide are illustrated in detail in FIG. 5.

FIG. 2 shows the position in which the workpiece 3 has been set on the support cradles 4, and the coupling element 11 of the mandrel 1 is fitted to the seat 10 of the extraction claw 6. In addition, the coupling element 11 of the mandrel 1 is provided on a mandrel pin 12 that projects from the end of the mandrel 1. The diameter of the mandrel pin 12 is significantly smaller than the diameter of the mandrel 1.

Figure 6:
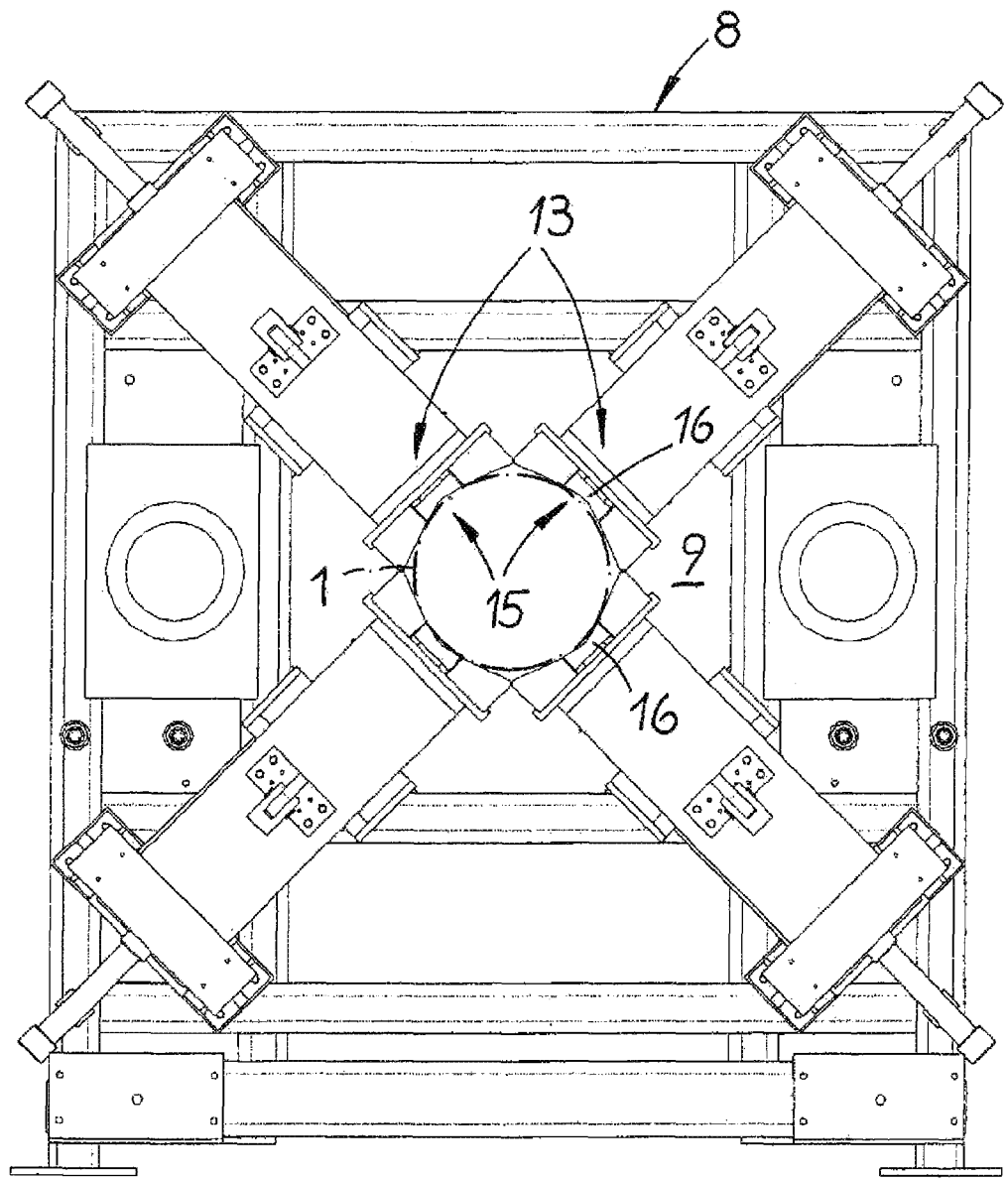
FIG. 6 is a view of a stripper frame with stripper jaws when engaged with a large-diameter mandrel.

In the illustrated embodiment, four stripper jaws 13 provided on the stripper frame 8 can move radially inward toward the mandrel 1 so as to be closely radially juxtaposed with or lightly engage the mandrel 1. The workpiece 3 is first pulled by the extractor slide 5 toward the stripper frame 8 until a winding-free cylindrical portion 14 is between the stripper jaws 13. The stripper jaws 13 are then shifted radially inward against the mandrel 1 or onto the winding-free portion 14 of the mandrel 1. This inner position of the stripper jaws 13 is clearly shown specifically in FIG. 6. The stripper jaws 13 are angularly equispaced relative to each other around the mandrel 1. Advantageously and in the illustrated embodiment, the stripper jaws 13 each have a concave contact 15 face open radially inward toward the mandrel 1. This enables a form-fit to be achieved between the stripper jaws 13 and the mandrel 1 (FIG. 6).

Figure 3:
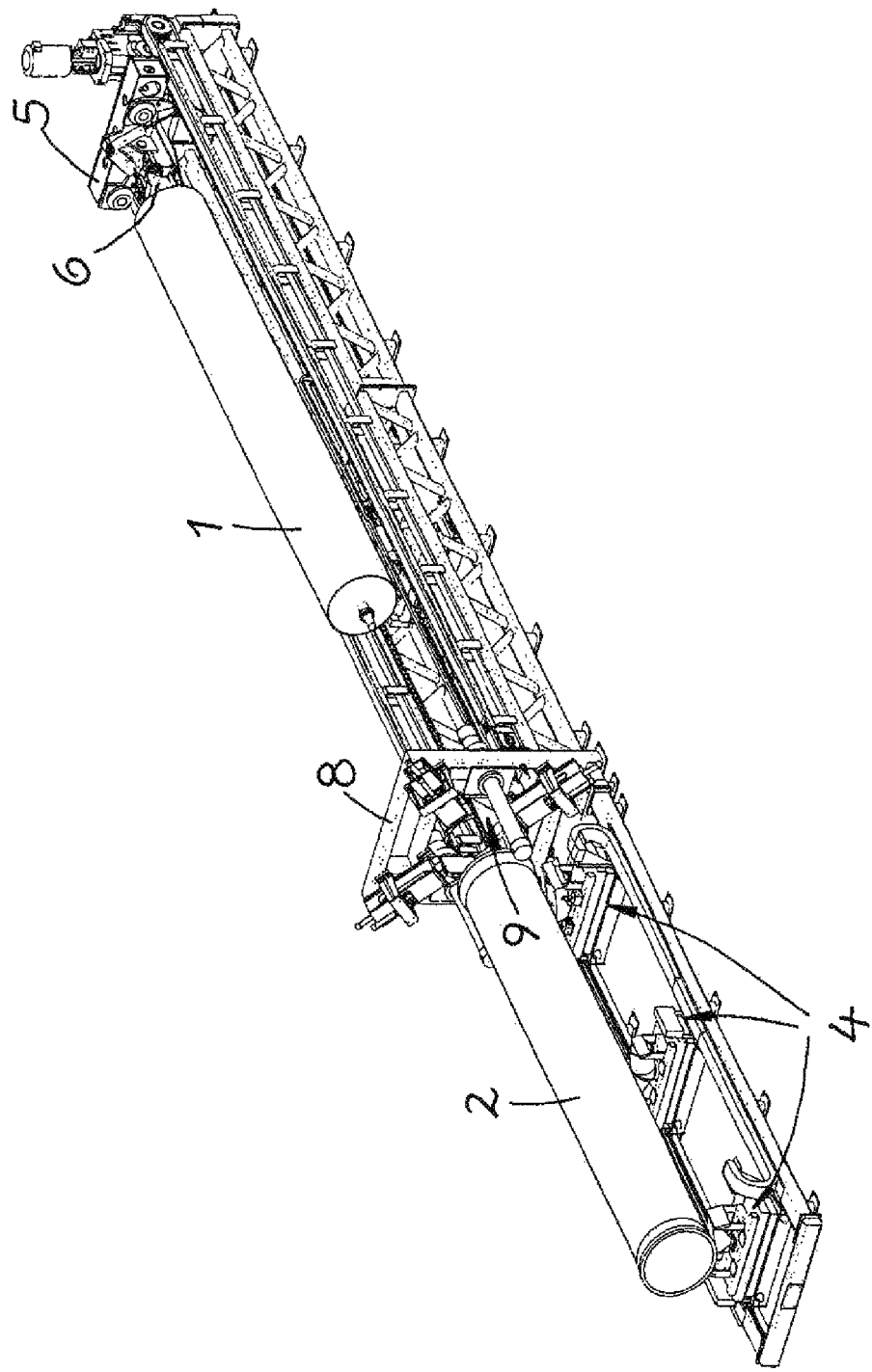
FIG. 3 shows the apparatus of FIG. 1 in a third position.
Figure 4:
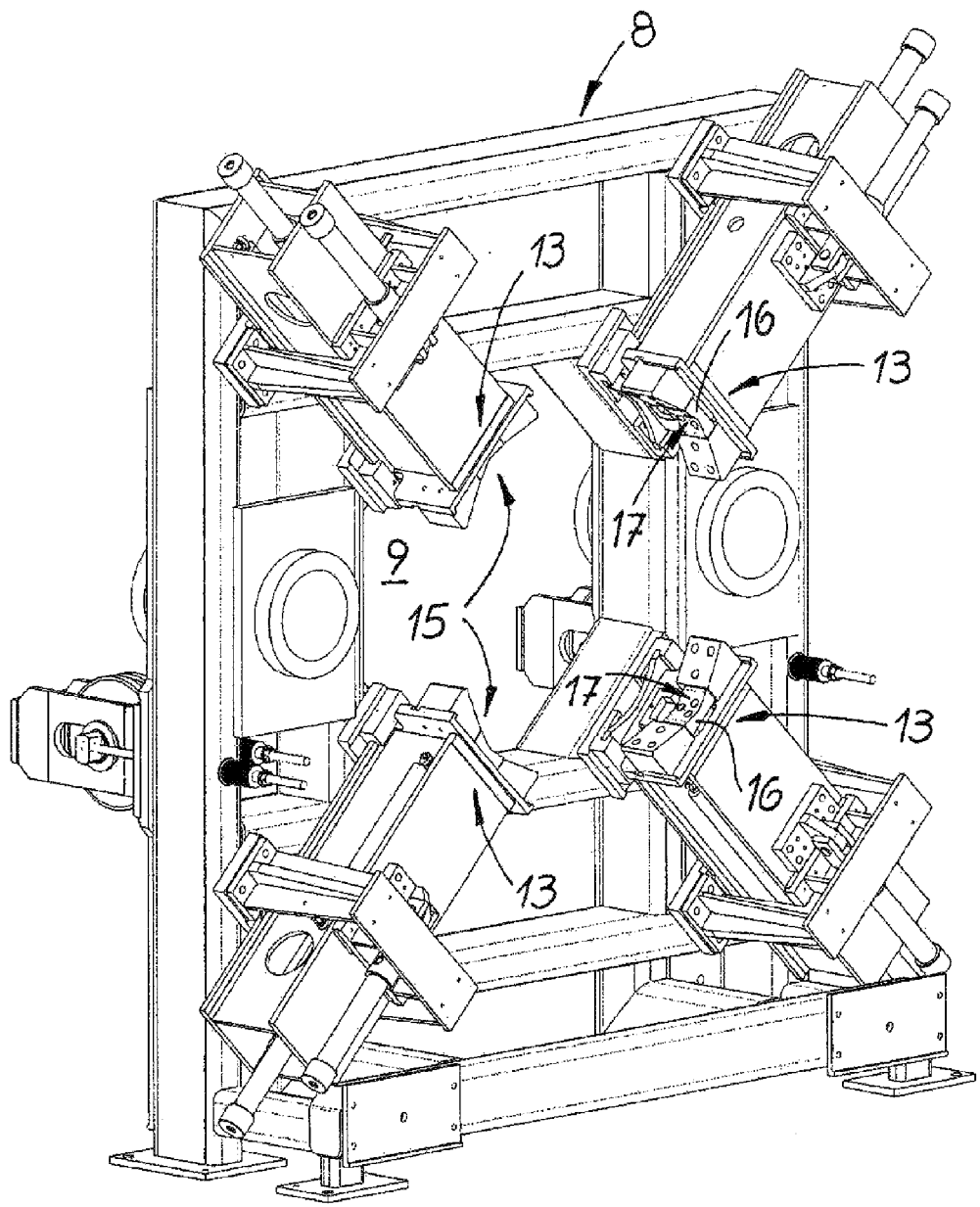
FIG. 4 is a perspective view illustrating the stripper frame of the extraction apparatus with stripper jaws according to the invention.

After the stripper jaws 13 have been brought into their inner positions engaging or very closely juxtaposed with the mandrel 1 or with the portion 14 of the mandrel 1, the extractor slide 5 is moved longitudinally away from the stripper frame 8 and pulls the mandrel 1 parallel to its axis A out of the shell 2. The shell 2 here is engaged or grasped by the stripper jaws 13 so that the mandrel 1 can move relative to the shell 2. On its end closer to the stripper frame 8, the shell 2 can have a radially outwardly projecting bulge 20 (FIG. 2) that extends around the shell 2. This type of radial bulge, or a support ring of this type, provides an especially reliable axial bracing of the shell 2 against the stripper jaws 13. Also shown in FIG. 3 is the position in which the mandrel 1 has been completely extracted from the shell 2. This mandrel 1 can then be conveyed back to a winding apparatus to again allow a shell 2 to be wound up on it.

Figure 7:
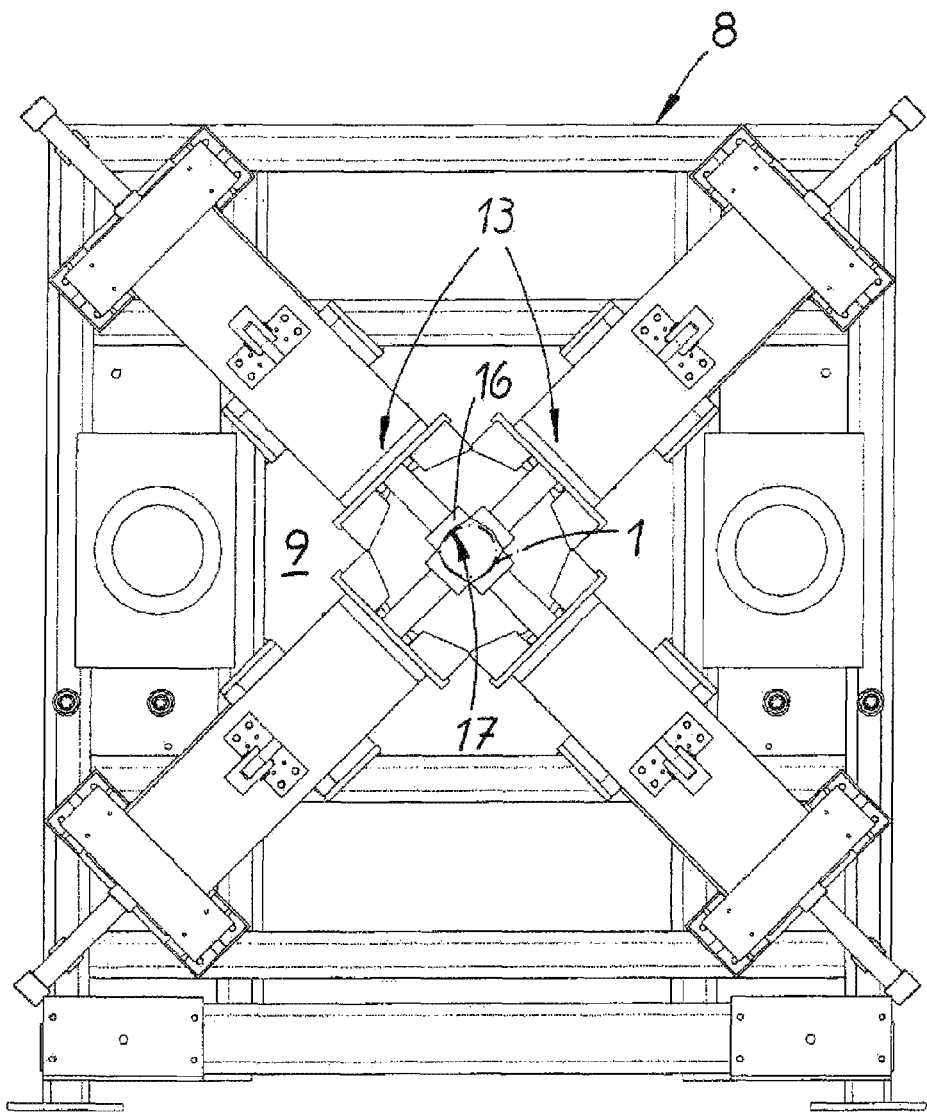
FIG. 7 shows the apparatus of FIG. 6 with a mandrel of relatively small diameter.
Figure 8:
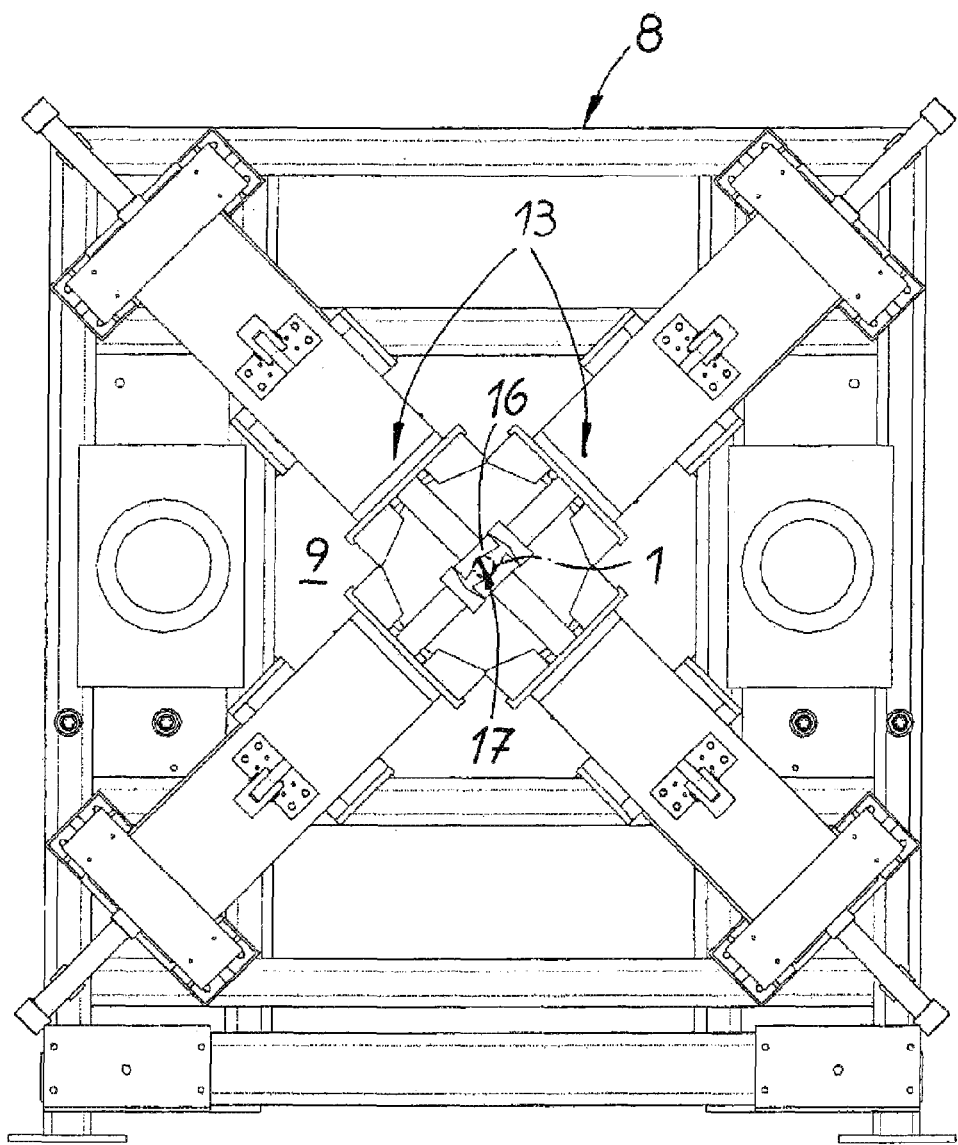
FIG. 8 shows the apparatus of FIG. 6 with a mandrel of very small diameter.

In an especially preferred illustrated embodiment, the stripper jaws 13 each have a central jaw segment 16 that is extendable from the respective stripper jaw 13 and that can be engaged with the mandrel 1. A contact face 17 of a jaw segment 16 here is of smaller radius of curvature than the contact face 15 of the respective stripper jaw 13. In the illustrated embodiment, the contact face 17 of the jaw segments 16 is approximately a third, or somewhat less than a third, the area of the contact face 15 of the respective stripper jaw 13. The jaw segments 16 are extended, in particular, when the diameter of the mandrel 1 is small, specifically whenever the stripper jaws 13 would interfere with one other on radial inward movement (FIGS. 7 and 8). In this case, only jaw segments 16 are engaging the mandrel 1.

In FIG. 7, all four jaw segments 16 have been engaged with a mandrel 1 of small diameter. A mandrel 1 of very small diameter is illustrated in the example of FIG. 8. Here jaw segments 16 would also interfere with each other during the repositioning process if all four jaw segments 16 were shifted radially inward. In FIG. 8, only two diametrically opposite jaw segments 16 have been engaged with the mandrel 1 that is of very small diameter.

Preferably and in the illustrated embodiment, the jaw segments 16 also have concave faces 17 open radially inward toward the mandrel 1. Advantageously and in the illustrated embodiment, the concave support faces 17 of jaw segments 16 sit flush with concave support face 15 of the other stripper jaw 13 when in the retracted position (see specifically FIG. 6). The figures also show that, preferably and in the illustrated embodiment, a jaw segment 16 is mounted centrally within each contact face 15 of each stripper jaw 13.

I claim:

1. An apparatus for separating a mandrel extending along an axis from a wound shell snugly surrounding the mandrel and lying against an outer surface thereof, the apparatus comprising:
    a base;
    an upright frame fixed on the base;
    a holder on the base forward of the frame and adapted to receive and support the shell surrounding the mandrel with an end of the mandrel in the shell on the support juxtaposed with the frame;
    at least three stripper jaws angularly generally equispaced about the axis on the support in the shell and movable radially relative to the axis of the mandrel of the shell on the frame between outer positions spaced radially outward from the shell and inner positions radially engaging or axially engageable with the shell, each jaw having a concave radial inner face and a small jaw segment shiftable independently of the respective jaw, whereby when a mandrel of small diameter is being stripped only the small jaw segments are used;
    an extractor slide shiftable longitudinally on the base rearward of the frame;
    a gripper on the slide extendable past the frame to grasp the end of the mandrel of the shell on the holder; and
    means for shifting the slide axially away from the frame while the gripper is grasping the mandrel end and while the stripper jaws are in their inner positions to brace the shell axially through the jaws against the frame and pull the mandrel out of the shell.

2. The apparatus defined in claim 1 wherein the holder comprises
    at least two axially spaced cradles; and
    means for axially and radially shifting and positioning the cradles.

3. The apparatus defined in claim 1 wherein the extractor slide has a ball-type universal joint on which the gripper is mounted.

4. The apparatus defined in claim 1 wherein the end of the mandrel has an axially extending pin adapted to fit with the gripper.

5. The apparatus defined in claim 1 wherein the shell has a radial bulge adjacent the mandrel end and the jaws axially engage against the bulge.

6. The apparatus defined in claim 1 wherein there are four such jaws.

7. The apparatus defined in claim 1 wherein there are four such jaws with respective jaw segments, the apparatus further comprising
    means for shifting only two of jaw segments inward when gripping a very small mandrel while leaving all four of the jaws in their outer positions.

8. The apparatus defined in claim 1 wherein the frame has an axially throughgoing opening and the gripper can pass axially through the opening.

9. The apparatus defined in claim 8 wherein the frame is closed all the way around the opening.

10. The apparatus defined in claim 9 wherein the opening is big enough that the mandrel can pass axially through the opening.

11. The apparatus defined in claim 1 wherein each jaw segment has a face that is substantially smaller than the face of the respective jaw.

12. The apparatus defined in claim 11 wherein each segment face has an area that is at most 50% of an area of the respective jaw.

13. The apparatus defined in claim 1 wherein each segment face is concave.

14. The apparatus defined in claim 13 wherein each segment is shiftable between a retracted position with the segments flush with the faces of the respective jaws and an extended position projecting therefrom.

15. The apparatus defined in claim 14 wherein each jaw segment is centrally mounted in the respective jaw and surrounded by the face of the respective jaw.

* * * * *